(Model.)
H. S. ORTTLÖPP & J. C. KLOBERG.
IMITATION FEATHER.
No. 282,661. Patented Aug. 7, 1883.
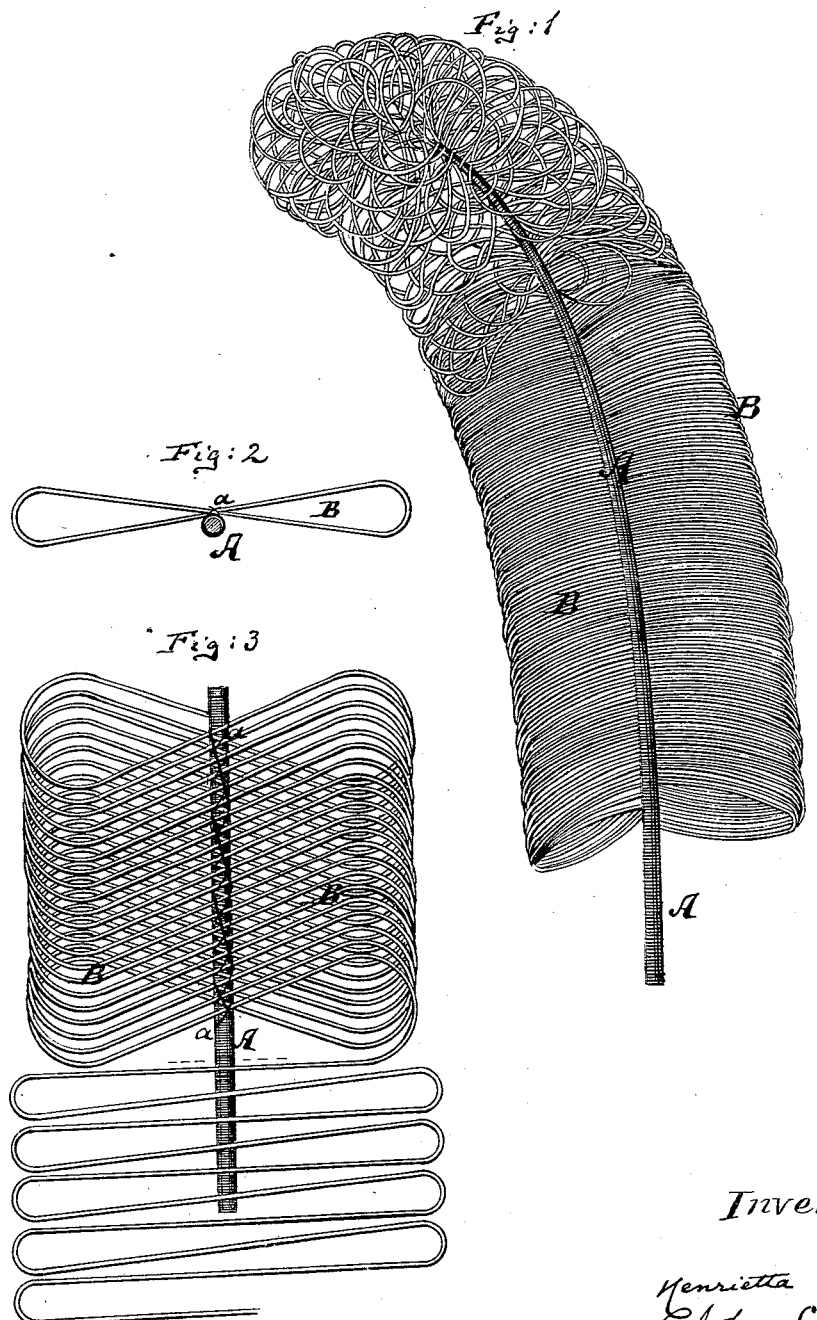

UNITED STATES PATENT OFFICE.

HENRIETTA S. ORTTLÖPP AND JOHN C. KLOBERG, OF NEW YORK, N. Y.; SAID KLOBERG ASSIGNOR TO SAID ORTTLÖPP.

IMITATION FEATHER.

SPECIFICATION forming part of Letters Patent No. 282,661, dated August 7, 1883.

Application filed December 13, 1882. (Specimens.)

*To all whom it may concern:*

Be it known that we, HENRIETTA SOPHIE ORTTLÖPP and JOHN C. KLOBERG, of New York, in the county and State of New York, have invented a new and Improved Imitation Feather, of which the following is a specification.

Figure 1 is a face view of our improved imitation feather; Fig. 2, a cross-section thereof; and Fig. 3, a back view of the same, showing how the parts are united.

The object of this invention is to produce from ordinary worsted and by a few stitches an imitation of an ostrich-feather or of other analogous feathers or feather-like structures; and the invention consists in combining with a stick of wood, whalebone, metal, or the like, which takes the place of the quill of the feather, looped worsted carried back and forth on one side of said stick, and stitches for tying said worsted to the stick. When the work is completed, the stick will be made to project as a rib above the rows of loops that extend from each side of it, thus producing a very close imitation of a feather.

In the drawings, the letter A represents the stick above mentioned, which may be made of any suitable material, either solid or tubular, and which, by preference, is pointed or tapering, as shown in Fig. 1, to increase the resemblance to the quill of a feather. This stick may be covered with silk or any other material, spun around it, so as to give it any suitable color and gloss.

B B are the loops, made of worsted or other thread, which is carried back and forth, either with regularity, as shown in the lower half of Fig. 1, or with some slight irregularity, as shown in the upper part of Fig. 1. These loops are laid mostly upon one side of the stick A, and are tied thereto by stitches $a$ $a$, which are applied either by hand or in any other suitable manner, said stitches being carried around the stick A and over the spaces where the loops B B cross each other, as indicated in Fig. 2.

In Fig. 3 is clearly shown a diagram indicating the manner in which the loops B B are placed on the quill and tied thereto by the stitches, part of the worsted being shown before it is stitched or tied fast.

We claim—

The combination of the quill or stem A with the worsted or thread B B, laid in loops against one side of said stem, and with the tying-stitches $a$, which unite said loops to said stem, substantially as specified.

This specification of our invention signed by us this 2d day of October, 1882.

HENRIETTA SOPHIE ORTTLÖPP.
JOHN C. KLOBERG.

Witnesses:
SAML. R. BETTS,
WILLY G. E. SCHULTZ.